US012086802B2

United States Patent
Ravinathan et al.

(10) Patent No.: US 12,086,802 B2
(45) Date of Patent: *Sep. 10, 2024

(54) METHOD AND SYSTEM FOR MEDIATED CROSS LEDGER STABLE COIN ATOMIC SWAPS USING HASHLOCKS

(71) Applicant: MASTERCARD ASIA/PACIFIC PTE. LTD., Singapore (SG)

(72) Inventors: Srinath Ravinathan, Singapore (SG); Donghao Huang, Singapore (SG); Hancong Guan, Singapore (SG); Karl Cheng, Singapore (SG); Phuoc Hoang Long Le, Singapore (SG); Weiming Ma, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,212

(22) Filed: Jul. 20, 2023

(65) Prior Publication Data
US 2023/0368197 A1    Nov. 16, 2023

Related U.S. Application Data

(63) Continuation of application No. 17/350,646, filed on Jun. 17, 2021, now Pat. No. 11,748,749.

(51) Int. Cl.
*G06Q 20/38*   (2012.01)
*G06F 16/23*   (2019.01)
*G06Q 20/02*   (2012.01)
*G06Q 20/36*   (2012.01)
(Continued)

(52) U.S. Cl.
CPC ....... *G06Q 20/389* (2013.01); *G06F 16/2379* (2019.01); *G06Q 20/02* (2013.01);
(Continued)

(58) Field of Classification Search
CPC .... G06Q 20/389; G06Q 20/02; G06Q 20/381; G06Q 20/38215; G06Q 20/3827;
(Continued)

(56) References Cited

U.S. PATENT DOCUMENTS

| 10,652,019 | B1* | 5/2020 | Nicolas | ................. H04L 9/3239 |
| 2021/0073913 | A1* | 3/2021 | Ingargiola | ............. G06Q 20/02 |

(Continued)

FOREIGN PATENT DOCUMENTS

| CN | 112507393 A | 3/2021 |
| CN | 112866380 A | 5/2021 |

(Continued)

OTHER PUBLICATIONS

Notification of Transmittal of the International Search Report and the Written Opinion of the International Searching Authority, or the Declaration, dated Jan. 20, 2023, issued in corresponding International Application No. PCT/SG2022/050420, 10 pps.

(Continued)

*Primary Examiner* — Patrick McAtee
*Assistant Examiner* — Vincent I Idiake
(74) *Attorney, Agent, or Firm* — Panitch Schwarze Belisario & Nadel LLP (57) ABSTRACT

A method for mediating an atomic swap includes: receiving a swap request from a first computing device including a first address associated with a first blockchain and a network identifier associated with a second blockchain; identifying a second computing device using the network identifier and a second address associated with the second blockchain; generating a proof value and a hashlock using the proof value; transmitting (i) the hashlock and second address to the first computing device, and (ii) the hashlock and first address to the second computing device; verifying a first blockchain transaction on the first blockchain for transfer to the first
(Continued)

address, and a second blockchain transaction on the second blockchain for transfer to the second address; and transmitting the proof value to blockchains node associated with the first and second blockchains.

16 Claims, 6 Drawing Sheets (51) Int. Cl.
    *G06Q 20/40*     (2012.01)
    *H04L 9/00*     (2022.01)
    *H04L 9/32*     (2006.01)

(52) U.S. Cl.
    CPC ..... *G06Q 20/381* (2013.01); *G06Q 20/38215* (2013.01); *G06Q 20/3827* (2013.01); *G06Q 20/401* (2013.01); *H04L 9/3239* (2013.01); *G06Q 20/3674* (2013.01); *G06Q 20/3825* (2013.01); *G06Q 20/3829* (2013.01); *H04L 9/50* (2022.05)

(58) Field of Classification Search
    CPC ............. G06Q 20/401; G06Q 20/3674; G06Q 20/3825; G06Q 20/3829; G06Q 20/0855; G06Q 20/065; G06F 16/2379; H04L 9/3239; H04L 9/50; H04L 9/3247
See application file for complete search history.

(56) References Cited

U.S. PATENT DOCUMENTS

2021/0398116 A1* 12/2021 Fang .................. G06Q 20/3829
2022/0197791 A1* 6/2022 Chadwick ............ G06F 11/073
2022/0300916 A1* 9/2022 Fytraki ................ G06Q 20/401

FOREIGN PATENT DOCUMENTS

EP             3933642 A1     1/2022
WO     WO-2021155915 A1 *  8/2021  ......... G06F 16/1865

OTHER PUBLICATIONS

Official Singapore Application No. 10202006466Y, filed Jul. 3, 2020, 98 pps.

* cited by examiner

METHOD AND SYSTEM FOR MEDIATED CROSS LEDGER STABLE COIN ATOMIC SWAPS USING HASHLOCKS

FIELD

The present disclosure relates to the mediation of atomic swaps, specifically the ability to swap currency across separate blockchain ledgers using atomic swaps and hashlocks using a mediation process.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

The popularity and versatility of blockchain has resulted in a large number of blockchains, where each utilizes its own unique digital currency. Many users and entities interested in blockchain may find themselves interested in participating in multiple blockchains for a variety of reasons. As a result, such users may have an interest in exchanging one blockchain currency to another or participating in a transaction with another user where both utilize different currencies. Traditionally there are two methods for such transactions. The first is to utilize an exchange service, which either requires the users to surrender their private keys to the exchange, or have both parties transfer their currency to the exchange. However, many parties may be wary of either option with using an exchange due to the dangers involved in surrendering their private key or trusting a third party with all of the funds. The second traditional method is the use of an atomic swap. Atomic swaps utilize hashlocks to ensure that either both parties will receive their currency or neither party will. However, atomic swaps typically require that both blockchains utilize the same hashing methodology, and require both parties to be capable of generating and utilizing the hashes required to accomplish the atomic swap.

Thus, there is a need for a technological improvement to performing atomic swaps, where parties can participate freely using legacy blockchain wallet functionality and that is agnostic of the hash methodologies used by the involved blockchains.

SUMMARY

The present disclosure provides a description of systems and methods for mediating an atomic swap. A processing server generates the data necessary for the hash lock, including the proof value that is to be used. The processing server acts as a mediator for both parties involved in the atomic swap, by providing the addresses and hashlock to both parties. The parties conduct the requisite transactions using the hashlocks and addresses provided by the processing server. The processing server verifies that both transactions were posted to the appropriate blockchains, and then provides the proof value to have the blockchains release the hashlocks and thereby release the funds to the parties. Using the processing server enables both parties to take advantage of the atomic swap without having to generate hashlocks themselves or even communicating with the other party, which provides for easier execution and greater security. The result is an improved atomic swap that is more secure and easier to execute for involved parties.

A method for mediating an atomic swap includes: receiving, by a receiver of a processing server, a swap request from a first computing device, wherein the swap request includes at least a first address associated with a first blockchain and a network identifier associated with a second blockchain; identifying, by a processor of the processing server, a second computing device based on at least the network identifier and a second address associated with the second blockchain; generating, by the processor of the processing server, a proof value and a hashlock, wherein the hashlock is generated using at least the proof value; transmitting, by a transmitter of the processing server, (i) at least the hashlock and second address to the first computing device, and (ii) at least the hashlock and first address to the second computing device; verifying, by the processor of the processing server, a first blockchain transaction posted to the first blockchain for transfer of a first currency amount to the first address, and a second blockchain transaction posted to the second blockchain for transfer of a second currency amount to the second address; and transmitting, by the transmitter of the processing server, at least the proof value to a first blockchain node associated with the first blockchain and to a second blockchain node associated with the second blockchain.

A system for mediating an atomic swap includes: a first computing device; a second computing device; and a processing server including a receiver receiving a swap request from the first computing device, wherein the swap request includes at least a first address associated with a first blockchain and a network identifier associated with a second blockchain, a processor identifying the second computing device based on at least the network identifier and a second address associated with the second blockchain, and generating a proof value and a hashlock, wherein the hashlock is generated using at least the proof value, a transmitter transmitting (i) at least the hashlock and second address to the first computing device, and (ii) at least the hashlock and first address to the second computing device, wherein the processor of the processing server further verifies a first blockchain transaction posted to the first blockchain for transfer of a first currency amount to the first address, and a second blockchain transaction posted to the second blockchain for transfer of a second currency amount to the second address, and the transmitter of the processing server further transmits at least the proof value to a first blockchain node associated with the first blockchain and to a second blockchain node associated with the second blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain— A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Mediating an Atomic Swap

Figure 1:
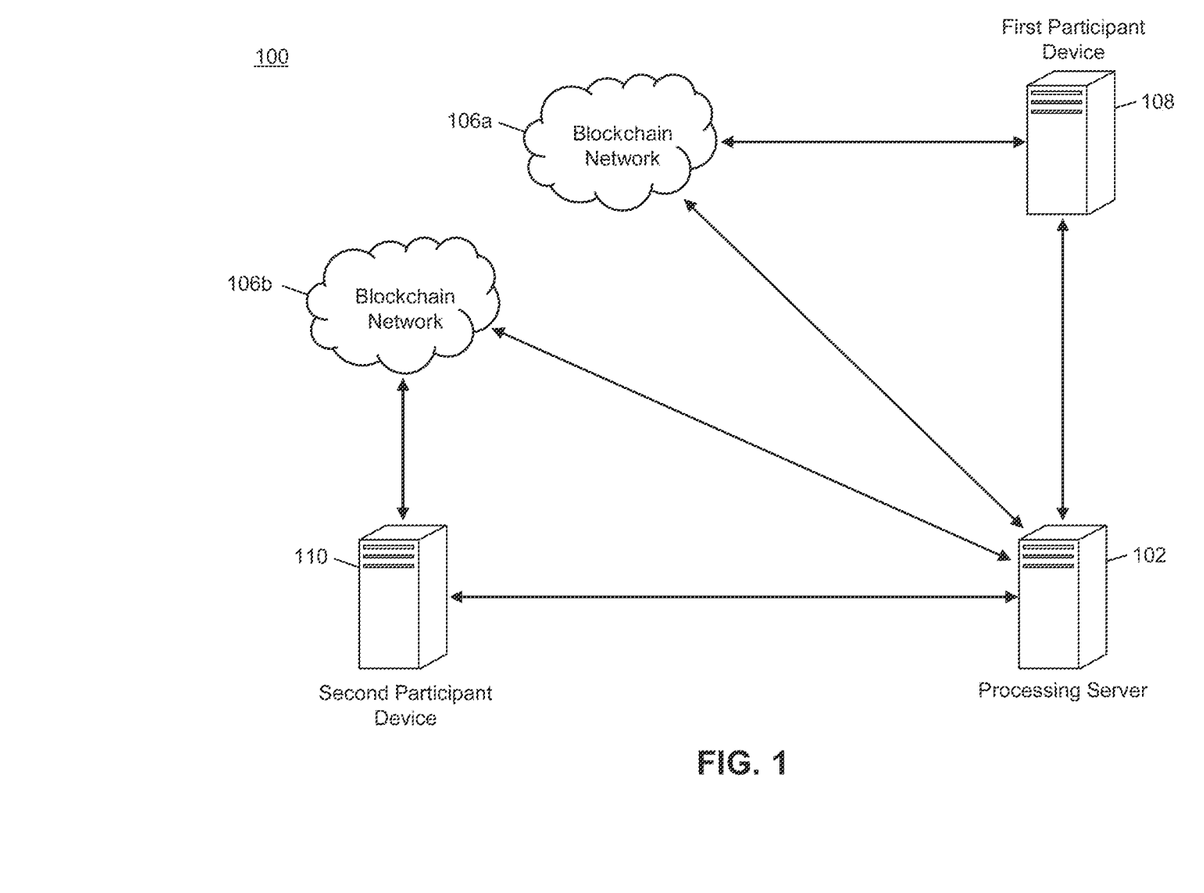
FIG. 1 is a block diagram illustrating a high level system architecture for mediating an atomic swap in accordance with exemplary embodiments.

FIG. 1 illustrates a system 100 for performing an atomic swap between two blockchains utilizing a mediator.

Figure 5:
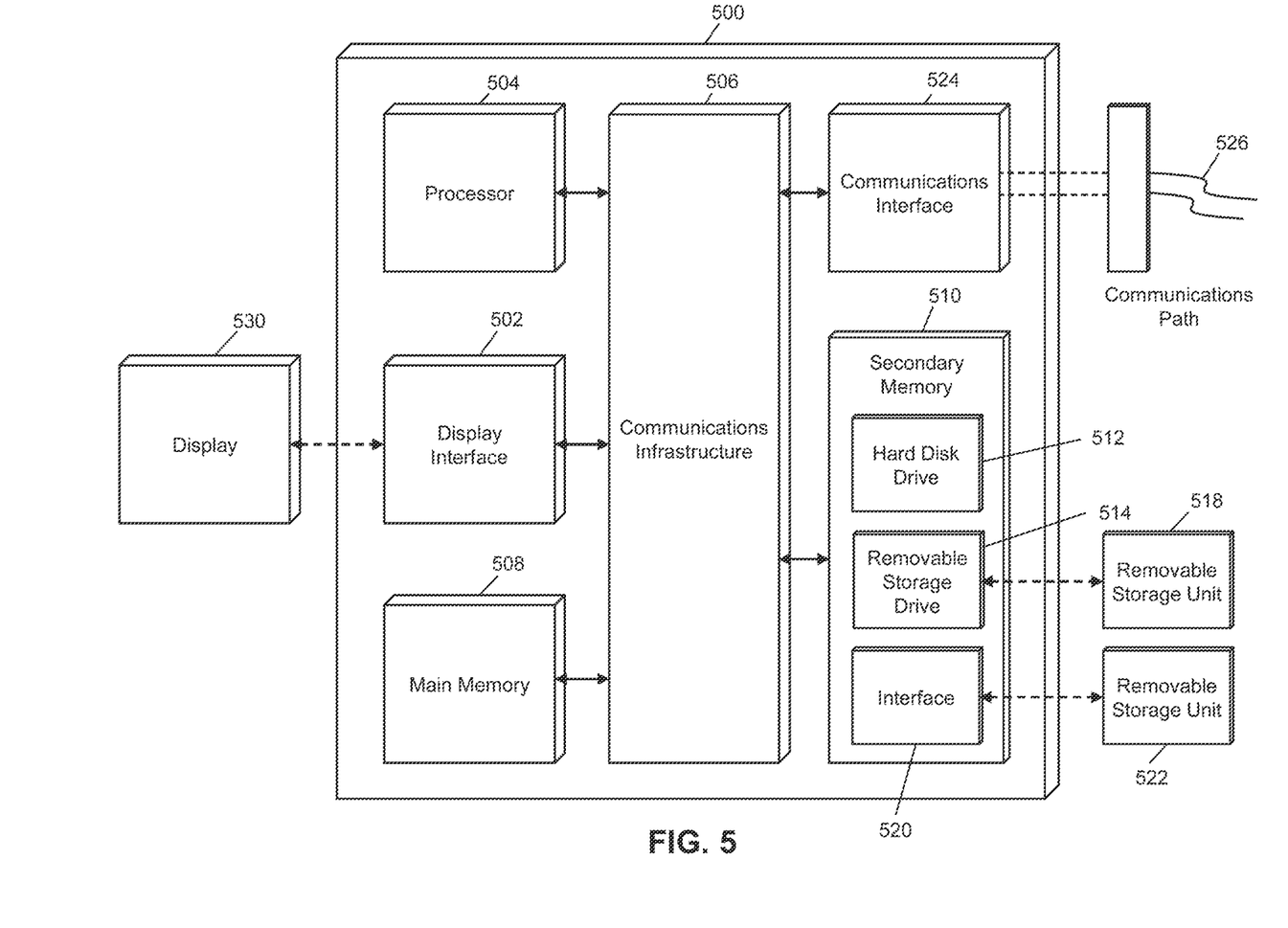
FIG. 5 is a block diagram illustrating a computer system architecture in accordance with exemplary embodiments.

The system 100 may be configured to enable an atomic swap that occurs between two different blockchain networks 106, illustrated in FIG. 1 as blockchain networks 106a and 106b. Each blockchain network 106 may be comprised of a plurality of different blockchain nodes. In some embodiments, one or more blockchain nodes may be a node in more than one blockchain network 106, including both blockchain networks 106a and 106b. Each blockchain node may be a computing system, such as illustrated in FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node in the blockchain network 106 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 106 using the public key of the cryptographic key pair. In some cases, the term "blockchain wallet" may refer specifically to the private key. In other cases, the term "blockchain wallet" may refer to a computing device (e.g., processing server 102, first participant device 108, or second participant device 110) that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a first participant device 108) that is generated using the sender's private key, a blockchain address of the recipient of currency (e.g., a second participant device 110) generated using the recipient's public key, and a blockchain currency amount that is transferred or other data being stored. In the case of the blockchain being used for data storage separate from currency, the currency amount may be replaced by such other data. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node in the blockchain network 106, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 106 before being added to the blockchain and distributed to all of the blockchain nodes in the blockchain network 106 in traditional blockchain implementations. In cases where a blockchain data value may not be related to a blockchain transaction, but instead the storage of other types of data, blockchain data values may still include or otherwise involve the validation of a digital signature.

The system 100 may include a processing server 102. The processing server 102, discussed in more detail below, may be configured to act as a mediator between the first participant device 108 and second participant device 110 for performing an atomic swap, to exchange a blockchain currency in a blockchain associated with a first blockchain network 106a, referred to herein as a first blockchain, with a blockchain currency in a blockchain associated with a second blockchain network 106b, referred to herein as a second blockchain. To start the process, a first participant device 108 may submit a swap request to the processing server 102 using any suitable communication network and method. For instance, the first participant device 108 may include an application program that is configured to submit swap requests to the processing server 102, may access a website through which swap requests can be submitted, or may access an application programming interface associated with the processing server 102.

The swap request may include at least a destination address on the blockchain on which the first participant device 108 wants to receive currency (e.g., in the first blockchain), which may be referred to herein as a first address. The destination address may be generated by the first participant device 108 using a blockchain wallet, such as by generating the address with a public key of a cryptographic key pair associated with the first blockchain. The swap request may also include a currency amount, which may be an amount of blockchain currency that the user associated with the first participant device 108 wants to transfer on the second blockchain or wants to receive on the first blockchain. In some cases, the swap request may include both currency amounts: how much the user wants to transfer on the second blockchain and how much they want to receive on the first blockchain. In other cases, only one currency amount may be provided, where the other amount may be determined, such as based on an exchange rate, which may depend on both blockchain networks 106 and the second participant device 110, as discussed below. In some embodiments, the swap request may also include an identifier for the first blockchain and/or second blockchain, where the identifier may be a unique identification value associated with the respective blockchain, the associated blockchain network 106, or the blockchain currency used by the respective blockchain. In cases where the swap request does not include such an identifier, the processing server 102 may be configured to identify the blockchain and/or blockchain network 106 based on the included currency amount (e.g., if the currency itself is specified, it may be used by the processing server 102 to identify the appropriate blockchain).

The processing server 102 may receive the swap request and may identify both blockchain networks 106 to be involved in the atomic swap based on the data included in the swap request. In some embodiments, the swap request may identify the second participant device 110, such as by including a device identifier or contact information for the second participant device 110, such as a telephone number, media access control address, internet protocol address, serial number, or other unique value. In other embodiments, the first participant device 108 may submit the swap request to the processing server 102 without having identified a second participant device 110. In such embodiments, the processing server 102 may assist the first participant device 108 in finding a second participant device 110 with which to perform the atomic swap.

In such embodiments, any device interested in participating in atomic swaps as a second participant device 110 (e.g., which may include the first participant device 108) may register with the processing server 102. Registration may include providing the processing server 102 with the device identifier associated with the device as well as a list of blockchain networks 106 (e.g., via identification values) with which the device has a blockchain wallet and may be willing to receive blockchain currency and/or transfer blockchain currency. In some instances, a registering device may also provide the public key for one or more networks with which the device is registering, such that the processing server 102 may be able to generate a receiving address to reduce the actions the device may need to perform during a mediated atomic swap. In some cases, registered devices may provide updates of their current balance on blockchains where the device is willing to transfer currency, which may be kept in that device's registration data in the processing server 102.

If the processing server 102 assists in finding a second participant device 110 for the first participant device 108, the processing server 102 may identify every device that has been registered to receive blockchain currency on the second blockchain and transfer blockchain currency on the first blockchain. In cases where currency balances are stored for registered devices, the processing server 102 may identify only those devices that have a sufficient balance based on the currency amount(s) provided in the swap request. In some cases, each registered device may have a desired exchange rate or fees involved with participating in an atomic swap as the second participant device 110. In such cases, the processing server 102 may calculate the currency amount(s) that may be necessary to achieve the atomic swap desired by the first participant device.

Once the processing server 102 has identified eligible devices, the processing server 102 may transmit a list of the identified devices to the first participant device 108 using a suitable communication network and method, such as in response to the received swap request. In instances where fees or exchange rates may vary across the eligible devices, the list may include the accompanying fees, exchange rates, amount of currency in the first blockchain the first participant device 108 would receive, and/or amount of currency in the second blockchain the first participant device 108 must transfer for each of the eligible devices. The user associated with the first participant device 108 may then select one of the eligible devices to serve as the second participant device 110 and submit the selection to the processing server 102 using the appropriate communication network and method.

The processing server 102 may receive the selection for the second participant device 110, and may also perform any additional calculations that may be necessary to determine the currency amounts for both the first blockchain and the second blockchain. In cases where the processing server 102 may have the public key for the selected second participant device 110 on the second blockchain stored, the processing server 102 may generate the destination address to be used to receive currency in the second blockchain for the second participant device 110. In cases where the processing server 102 does not have the public key, the processing server 102 may submit a request for the destination address to the selected second participant device 110. The request may include at least the identifier for the second blockchain, and may include any additional information desired by the second participant device 110, such as the currency amount for the first blockchain or the second blockchain, the exchange rate and/or fees used, etc. The second participant device 110 may then identify the appropriate blockchain wallet using the received identifier and generate a destination address for the second blockchain using the public key of the respective cryptographic key pair. The second participant device 110 may electronically transmit the destination address back to the processing server 102 using a suitable communication network and method.

The processing server 102 may be ready to initiate the process for the atomic swap. To start the process, the processing server 102 may generate a value to be used as a proof value for a hashlock. The value may be a unique value that is unique to the transaction and may be randomly or pseudo-randomly generated, built based on information for the first participant device 108 and second participant device 110 (e.g., from the first and second addresses), or identified using any other suitable method. The proof value may be generated and/or identified by the processing server 102, but may not be known to any other devices, particularly the first participant device 108 and the second participant device 110. The processing server 102 may then generate the hashlock. A hashlock is a scrambled version of a cryptographic key or other value generated that, when placed on a transaction, locks the transaction output until the hash value is unlocked using the original cryptographic key or other value. In the system 100, the processing server 102 may generate the hashlock using the proof value, where the hashlock will be placed on the transfers made by the first participant device 108 and second participant device 110, which can only be unlocked by the processing server 102 using the proof value. The hashlock may be generated, for instance, by applying a hashing algorithm to the proof value. In some cases, the hashlock may also be generated using additional data associated with the atomic swap being performed, such as the first address, second address, currency amount for the first blockchain or second blockchain, etc. In some embodiments, the processing server 102 may generate a separate hashlock for the first participant device 108 to be used on the second blockchain and for the second participant device 110 to be used on the first blockchain, such as by using different data when generating the hashlock, but may utilize the same proof value for both hashlocks.

Once the hashlock has been generated, the processing server 102 may electronically transmit the data necessary for each participating device to conduct their appropriate transaction to the appropriate participating device. For example, the processing server 102 may transmit at least the destination address on the second blockchain (e.g., provided by the second participant device 110), the currency amount for the second blockchain, and the hashlock to the first participant device 108, and may transmit at least the destination address on the first blockchain (e.g., from the swap request), the currency amount for the first blockchain, and the hashlock to the second participant device 110. In some instances, the processing server 102 may not transmit any redundant information that the appropriate participant device may have already received (e.g., in the swap request or when requesting a destination address).

The participant devices may receive the data and may submit new blockchain transactions to the appropriate blockchains for the transfer of currency as indicated in the received data. For example, the first participant device 108 may generate a blockchain transaction for the second blockchain for transfer of the proper currency amount to the destination address associated with the blockchain wallet of the second participant device 110, and then submit the blockchain transaction to a blockchain node in the blockchain network 106b. The second participant device 110 may generate a new blockchain transaction for the first blockchain for transfer of the proper currency amount to the destination address that had been submitted in the swap request, which may then be submitted to a blockchain node in the blockchain network 106a.

Once both blockchain transactions have been posted to their respective blockchains using traditional methods and systems, the processing server 102 may verify that the transactions were posted and are correct (e.g., with the appropriate amount of currency transferred to the appropriate destination address). In some embodiments, the first participant device 108 and second participant device 110 may receive confirmation messages from blockchain nodes after submitting their transactions, such as may include an identifier for the blockchain data value that stores the submitted blockchain transaction on the blockchain. In such embodiments, the first participant device 108 and second participant device 110 may provide the received identifiers and/or confirmation messages to the processing server 102 for use in identifying the blockchain transactions on the first and second blockchains. In other embodiments, the processing server 102 may monitor both the first blockchain and the second blockchain for addition of a blockchain transaction that matches the desired atomic swap, such as by monitoring for the destination addresses supplied to each participant device.

After the blockchain transactions have been identified, the processing server 102 may validate each transaction. Validation of the transaction may include verifying that the destination address is accurate and that the currency amount being transferred is accurate. In some cases, the processing server 102 may also verify that the hashlock is the same hashlock provided by the processing server 102 previously. In some embodiments, the processing server 102 may digitally sign the hashlock before providing the hashlock to the first participant device 108 and second participant device 110, such as by using a private key of a cryptographic key pair. In such embodiments, the processing server 102 may validate the digital signature using the corresponding public key in the cryptographic key pair as part of the validation of the blockchain transaction. If one or both of the blockchain transactions cannot be successfully verified, then the processing server 102 may notify the appropriate participant device, and may provide the participant device with an opportunity to submit a corrected blockchain transaction. If there is no successful validation of both blockchain transactions, then the hashlocks may not be removed by the processing server 102, which may prevent the transactions from being unlocked, thereby preventing the transfers. In some cases, the hashlocks may have expiration times associated therewith (e.g., via a smart contract, the blockchain network 106, etc.) where, if the hashlock is not unlocked within the expiration time, the corresponding blockchain transaction will not take place (e.g., will remain locked with the input able to be used again by the sender or with a reversal transaction automatically being posted to the blockchain).

If both blockchain transactions are successfully validated, then the processing server 102 may release the hashlocks. The processing server 102 may electronically transmit the proof value to a blockchain node in the first blockchain network 106a and a blockchain node in the second blockchain network 106b to release the hashlock, where the proof value can be used by the blockchain node to generate the hashlock and verify a match to ensure that the processing server 102 is authorized to remove the hashlocks. In instances where other data was used in addition to the proof value to generate the hashlocks, the additional data may also be transmitted to the blockchain nodes. In cases where separate hashlocks are generated for each blockchain transaction, the processing server 102 may transmit the appropriate data to the appropriate blockchain node accordingly. With the hashlocks removed, both the first participant device 108 and second participant device 110 will receive their currency on the first blockchain and the second blockchain, respectively, making the atomic swap complete.

In an example implementation, the processing server 102 may utilize the following code to define and create a hashlock that is created using a currency amount, destination address, and proof value:

```
class AtomicSwapContract:
    struct HashLock{
        Coin amount
        Address recipient
        byte[ ] hashKey
    }
    public CreateHashLock(double amount, Address recipient, byte[ ] hashKey){
        Coin coin = WithdrawAmountFromSenderAccount(amount)
        HashLock hashLock = new HashLock(coin, recipient, hashKey)
        PublishHashLockTransactionToSenderAccount(hashLock)
    }
}
```

In the above example, hashKey may be the proof value generated by the processing server 102 as discussed above.

When a hashlock is to be unlocked, the processing server 102 may utilize the following function in the example implementation:

```
public Unlock(Address addressOfSmartContract, Address recipient, byte[ ] secretKey){
    HashLock hashLock = ReadTransactionFromSender(addressOfSmartContract)
    // Ensure the recipient of the hashLock is same as provided
    assert(hashLock.recipient = = recipient)
    // Ensure the hashes match, otherwise this transaction will fail
    byte[ ] hashOfSecretKey = Hash(secretKey)
    assert(hashLock.hashKey = = hashOfSecretKey)
    // Second participant receives the amount from the first participant.
    SendTransaction(hashLock.recipient, hashLock.amount)
}
```

In some embodiments, hashlocks and atomic swaps may be implemented by blockchains through the use of smart contracts, which may be self-executing contracts stored in a blockchain. Smart contracts may utilize different programming languages, code, and protocols that may differ from one blockchain network 106 to the next. In one example, a blockchain network 106 may utilize Solidity® as the programming language for smart contracts used by the associated blockchain. In Solidity, the above functions may be executed using the following code, for example:

```
contract AtomicSwap {
    struct Swap {
        address sender;
        address recipient;
        uint startTime;
        uint duration;
        uint amount;
        bool active;
    }
    mapping(bytes32=>Swap) swaps;
    event SwapStart(address indexed sender,
            address indexed recipient,
            bytes32 indexed hashedSecret,
            uint startTime,
            uint duration,
            uint amount);
    function startSwap(address recipient, uint duration, bytes32 hashedSecret)
    public payable {
            require(! swaps[hashedSecret].active);
            require(msg.value > 0);
            Swap memory swap;
            swap.sender = msg.sender;
            swap.recipient = recipient;
            swap.startTime = now;
            swap.duration = duration;
            swap.amount = msg.value;
            swap.active = true;
            swaps[hashedSecret] = swap;
            emit SwapStart(swap.sender, swap.recipient, hashedSecret, swap.startTime, swap.duration, swap.amount);
    }
    event SwapCancel(bytes32 indexed hashedSecret, uint time);
    function cancelSwap(bytes32 hashedSecret) public {
        Swap memory swap = swaps[hashedSecret];
        require(swap.sender = = msg.sender);
        require(swap.active);
        require(now >= swap.startTime + swap.duration);
        swaps[hashedSecret].active = false;
        msg.sender.transfer(swap.amount);
        emit SwapCancel(hashedSecret, now);
    }
    event SwapComplete(bytes32 indexed hashedSecret, uint time);
    function completeSwap(bytes memory secret) public {
        bytes32 hashedSecret = keccak256(secret);
        Swap memory swap = swaps[hashedSecret];
        require(swap.recipient = = msg.sender);
```

```
    require(swap.active);
    require(now < swap.startTime + swap.duration);
    swaps[hashedSecret].active = false;
    msg.sender.transfer(swap.amount);
    emit SwapComplete(hashedSecret, now);
}
// auxilary function to get swap info
function getSwapInfo(bytes32 hashedSecret) public view
    returns(address sender,
        address recipient,
        uint startTime,
        uint duration,
        uint amount,
        bool active) {
    Swap memory swap = swaps[hashedSecret];
    sender = swap.sender;
    recipient = swap.recipient;
    startTime = swap.startTime;
    duration = swap.duration;
    amount = swap.amount;
    active = swap.active;
}
// auxilary function to help calculate the hashed secret on chain
function hashSecret(bytes memory secret) public pure returns
(bytes32){
    return keccak256(secret);
}
}
```

In the above example, Swap may be the construct for the data of the atomic swap to be performed, SwapStart may be called to generate the hashlock for both transactions, SwapCancel may be used if the atomic swap is to be stopped and the transactions not successfully published (e.g., due to failed validation or withdrawal by one of the participant devices), SwapComplete may be used to remove the hashlocks and have both transactions complete, and getSwapInfo may be used to identify the current status of an atomic swap, such as to check on expiration time while the processing server 102 is awaiting validation of the two blockchain transactions. It will be apparent to persons having ordinary skill in the art that the above code is an example and may not be exhaustive of all implementations of the methods and systems discussed herein using Solidity or any other programming language.

The methods and systems discussed herein provide for the mediation of an atomic swap by the processing server 102. By mediating the atomic swap in the manner discussed herein, a first participant device 108 can have a swap that is desired without surrendering its own private key or public key or without even identifying a second participant device 110, as one can be identified by the processing server 102 on their behalf. In addition, because the transactions take place independently on both blockchains with the processing server 102 as mediator being responsible for the hashlock, the atomic swap can be performed without regard for the hashing methodologies and other technological differences between the blockchain networks 106. As a result, the methods and systems discussed herein provide for atomic swaps with greater versatility while also increasing convenience and security for participants by use of a mediator and the processes discussed herein.

Processing Server

Figure 2:
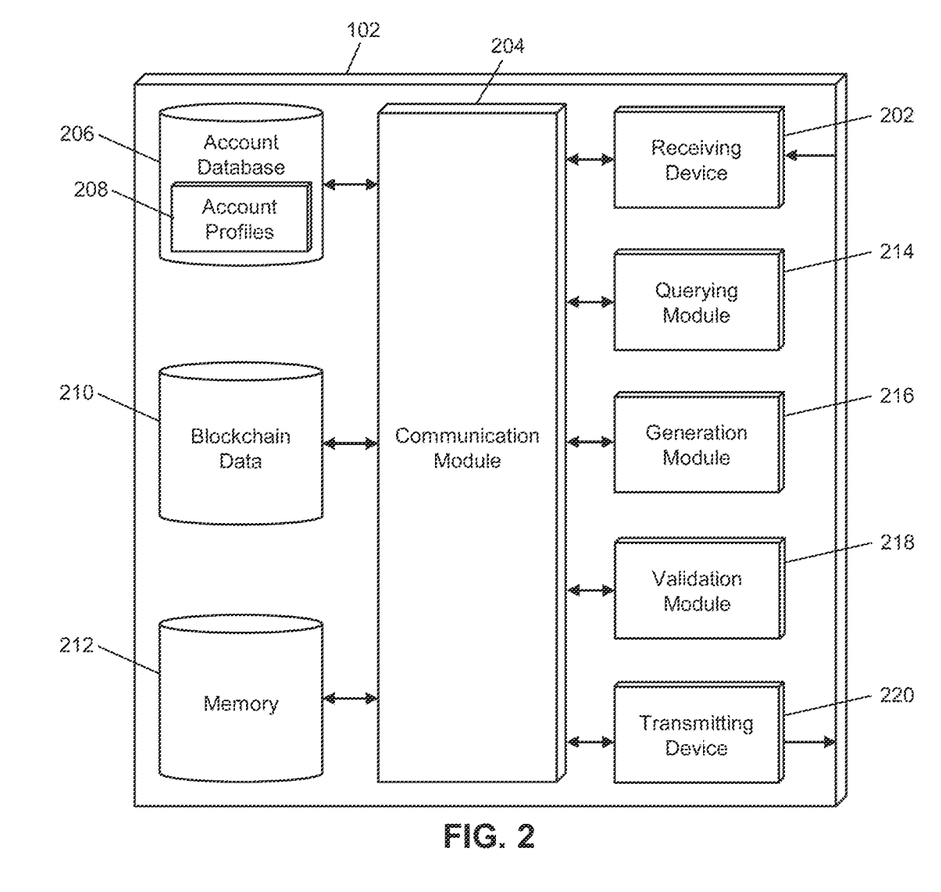
FIG. 2 is a block diagram illustrating a processing server of the system of FIG. 1 for mediating an atomic swap in accordance with exemplary embodiments.

FIG. 2 illustrates an embodiment of a processing server 102, such as the processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from blockchain nodes, first participant devices 108, second participant devices 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by blockchain nodes, which may be superimposed or otherwise encoded with blockchain data values, blocks, blockchain transaction data, etc. The receiving device 202 may also be configured to receive data signals electronically transmitted by first participant devices 108, which may be superimposed or otherwise encoded with swap requests, destination addresses, transaction identifiers, registration data, etc. The receiving device 202 may also be configured to receive data signals electronically transmitted by second participant devices 110 that may be superimposed or otherwise encoded with registration data, destination addresses, fees, exchange rates, network identifiers, transaction identifiers, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software executed on hardware or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to one or more registered accounts, such as for any device registered to serve as a second participant device 110 in an atomic swap, as discussed above. For instance, an account profile 208 may be associated with second participant device 110 and store data necessary for identification of that device as a second participant device 110 and participation in an atomic swap. For example, the account profile 208 may include a device identifier, identifier for each blockchain network 106 where the associated device may receive currency or may transfer currency, currency balances in any blockchain where the associated device may transfer currency, public keys of cryptographic key pairs for blockchains where the associated device may receive currency, contact information, fees, exchange rates, etc.

The processing server 102 may also include blockchain data 210, which may be stored in a memory 212 of the processing server 102 or stored in a separate area within the processing server 102 or accessible thereby. The blockchain data 210 may include a blockchain, which may be comprised of a plurality of blocks and be associated with the blockchain network 106. The blockchain data 210 may also or alternatively include any data associated with one or more blockchain wallets that may be used by the processing server 102, such as cryptographic key pairs, unspent transaction outputs, digital asset amounts, network identifiers for the blockchain networks 106, smart contracts, signature generation algorithms, encryption algorithms, communication information for third party services, etc.

The processing server 102 may also include a memory 212. The memory 212 may be configured to store data for use by the processing server 102 in performing the functions discussed herein, such as public and private keys, symmetric keys, etc. The memory 212 may be configured to store data using suitable data formatting methods and schema and may be any suitable type of memory, such as read-only memory, random access memory, etc. The memory 212 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 212 may be comprised of or may otherwise include a relational database that utilizes structured query language for the storage, identification, modifying, updating, accessing, etc. of structured data sets stored therein. The memory 212 may be configured to store, for example, cryptographic keys, salts, nonces, communication information for other computing systems, generation algorithms, cryptographic key pairs, algorithms for calculation of currency amounts, exchange rates, identifiers for blockchain networks 106, etc.

The processing server 102 may include a querying module 214. The querying module 214 may be configured to execute queries on databases to identify information. The querying module 214 may receive one or more data values or query strings, and may execute a query string based thereon on an indicated database, such as the account database 206 of the processing server 102 to identify information stored therein. The querying module 214 may then output the identified information to an appropriate engine or module of the processing server 102 as necessary. The querying module 214 may, for example, execute a query on the account database 206 to find all registered devices that may be eligible to act as a second participant device 110 for an atomic swap requested by the first participant device 108, such as based on a network identifier included in the swap request.

The processing server 102 may also include a generation module 216. The generation module 216 may be configured to generate data for use by the processing server 102 in performing the functions discussed herein. The generation module 216 may receive instructions as input, may generate data based on the instructions, and may output the generated data to one or more modules of the processing server 102. For example, the generation module 216 may be configured to generate cryptographic key pairs, generate digital signatures, generate blockchain data values, etc. The generation module 216 may also be configured to generate proof values and hashlocks, and to generate any data necessary for the removal of hashlocks generated by the processing server 102.

The processing server 102 may also include a validation module 218. The validation module 218 may be configured to perform validations for the processing server 102 as part of the functions discussed herein. The validation module 218 may receive instructions as input, which may also include data to be used in performing a validation, may perform a validation as requested, and may output a result of the validation to another module or engine of the processing server 102. The validation module 218 may, for example, be configured to validate digital signatures using suitable signature generation algorithms and keys, validate blockchain transactions, validate smart contracts, validate hashlocks, etc.

The processing server 102 may also include a transmitting device 220. The transmitting device 220 may be configured to transmit data over one or more networks via one or more network protocols. In some instances, the transmitting device 220 may be configured to transmit data to blockchain nodes, first participant devices 108, second participant devices 110, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to blockchain nodes, which may be superimposed or otherwise encoded hashlocks, data for the removal of hashlocks, requests for blocks or blockchain data values, etc. The transmitting device 220 may also be configured to electronically transmit data signals to first participant devices 108, which may be superimposed or otherwise encoded with requests for addresses, lists of eligible second participant devices 110, currency amounts, fees, exchange rates, data for new blockchain transactions, notifications, etc. The transmitting device 220 may be configured to electronically transmit data signals to second participant devices 110, which may be superimposed or otherwise encoded with requests for destination addresses or currency amount data, data foe new blockchain transactions, notifications, requests for updated currency balances, etc.

Process for Executing a Mediated Atomic Swap

Figure 3A:
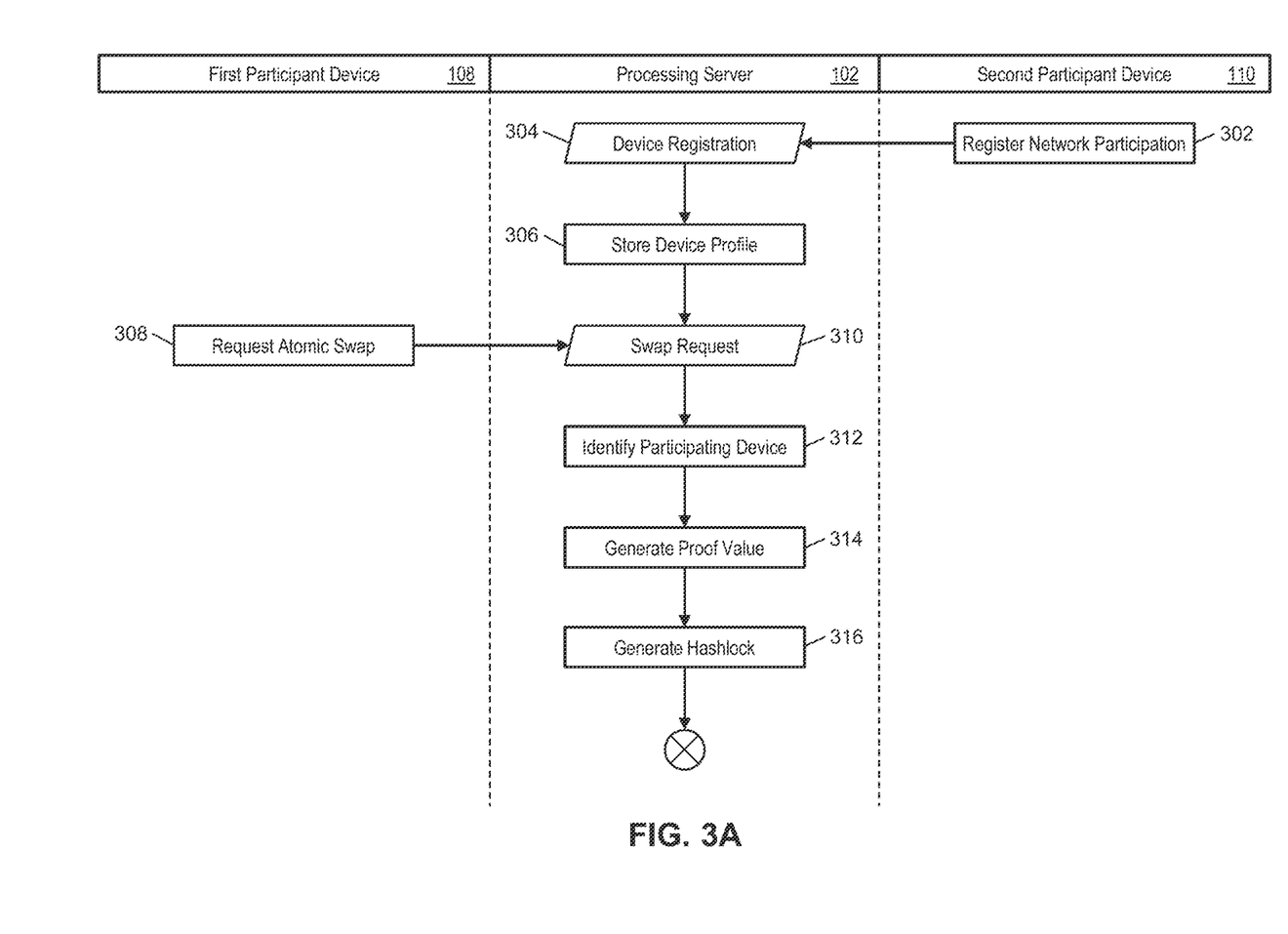
FIGS. 3A and 3B are a flow diagram illustrating a process for executing a mediated atomic swap in the system of FIG. 1 in accordance with exemplary embodiments.
Figure 3B:
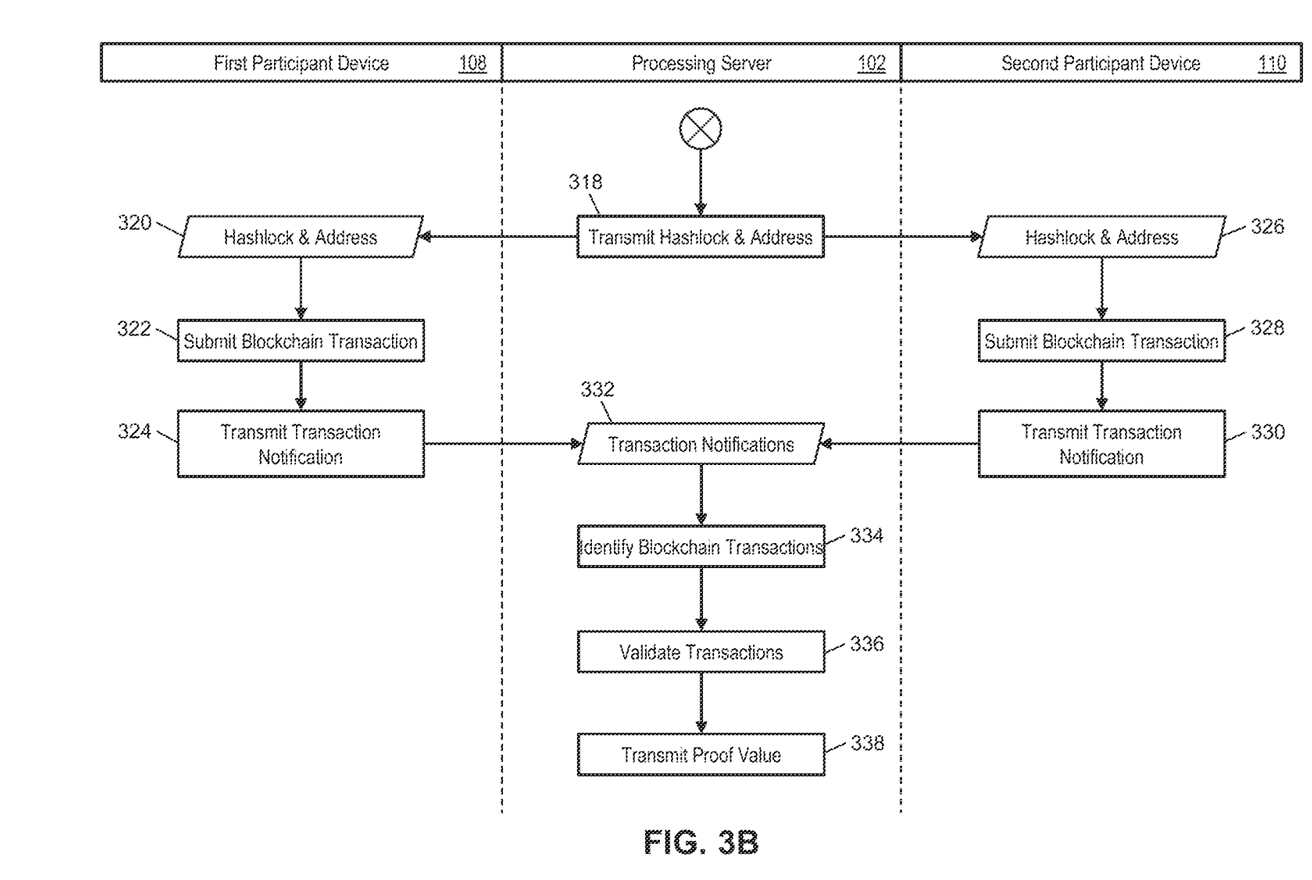

FIGS. 3A and 3B illustrate a process for executing an atomic swap in the system 100 of FIG. 1 involving the first participant device 108 and second participant device 110 that is mediated by the processing server 102.

In step 302, the second participant device 110 may register with the processing server 102 for participation in atomic swaps by electronically transmitting registration data to the processing server 102. The registration data may include, for instance, a device identifier and/or contact information for the second participant device 110, a list of identifiers for blockchains where the second participant device 110 is willing to accept currency, and a list of identifiers for blockchains where the second participant device is willing to transfer currency. In step 304, the receiving device 202 of the processing server 102 may receive the registration data from the second participant device 110. In step 306, the querying module 214 of the processing server 102 may execute a query on the account database 206 of the processing server 102 to insert a new account profile 208 therein for the second participant device 110 that includes the received device registration data.

In step 308, the first participant device 108 may submit a request for an atomic swap to the processing server 102 using a suitable communication network and method. The swap request may include at least the destination address for a first blockchain where the first participant device 108 wants to receive currency, a currency amount the first participant device 108 wants to receive on the first blockchain, and one or more identifiers for second blockchains through which the first participant device 108 is willing to transfer currency. In step 310, the receiving device 202 of the processing server 102 may receive the swap request.

In step 312, the querying module 214 of the processing server 102 may execute a query on the account database 206 of the processing server 102 to identify the account profiles 208 of any registered device that may be suitable to act as the second participant device 110 in the atomic swap, such as by checking to see if the account profile 208 includes a designation of the first blockchain as one the associated device is willing to transfer currency on, and includes a designation of one of the second blockchains as one the associated device is willing to receive currency on. In some embodiments, the processing server 102 may identify multiple eligible devices and may request a selection of one of the devices from the first participant device 108. In the example illustrated in FIGS. 3A and 3B, the processing server 102 may identify the second participant device 110 device as eligible and proceed with the process accordingly. As part of step 312, the processing server 102 may identify a destination address for the second participant device 110 on a second blockchain (e.g., selected from all eligible second blockchains by the processing server 102, first participant device 108, or second participant device 110), such as by generating the destination address (e.g., via the generation module 216 using a public key for the second blockchain stored in the account database 208) or requesting the destination address from the second participant device 110 for the second blockchain.

In step 314, the generation module 216 of the processing server 102 may generate a proof value to be used in a hashlock. The proof value may be generated or identified using any suitable method and may be unique to the atomic swap being requested by the first participant device 108. In step 316, the generation module 216 of the processing server 102 may generate a hashlock using at least the proof value, such as by applying a hashing algorithm to the proof value where the hashlock is the resulting hash value. In step 318, the transmitting device 220 of the processing server 102 may electronically transmit the hashlock and suitable transaction data to both the first participant device 108 and the second participant device 110. The first participant device 108 may be transmitted the hashlock, destination address for the second blockchain for the second participant device 110, and currency amount for the second blockchain. The second participant device 110 may be transmitted the hashlock, destination address for the first blockchain for the first participant device 108, and currency amount for the first blockchain.

In step 320, the first participant device 108 may receive the hashlock, destination address, and currency amount from the processing server 102. In step 322, the first participant device 108 may submit a new blockchain transaction to a blockchain node in the second blockchain network 106b for transfer of the received currency amount to the received destination address using one or more appropriate transaction outputs (e.g., that cover the currency amount) for which the first participant device 108 has possession using traditional methods and systems. The blockchain transaction may be hashlocked by the hashlock being transmitted by the first participant device 108 or by being separately submitted to the blockchain network 106b by the processing server 102 prior to the new blockchain transaction being submitted. The first participant device 108 may receive a transaction identifier as a notification from the blockchain node that the new blockchain transaction was successfully confirmed, added to a new block, and posted to the second blockchain. In step 324, the first participant device 108 may electronically transmit the transaction identifier in a notification to the processing server 102 that the blockchain transaction has been successfully posted.

In step 326, the second participant device 110 may receive the hashlock, destination address, and currency amount from the processing server 102. In step 328, the second participant device 110 may submit a new blockchain transaction to a blockchain node in the first blockchain network 106a for transfer of the received currency amount to the received destination address using one or more appropriate transaction outputs (e.g., that cover the currency amount) for which the second participant device 110 has possession using traditional methods and systems. The blockchain transaction may be hashlocked by the hashlock being transmitted by the second participant device 110 or by being separately submitted to the blockchain network 106a by the processing server 102 prior to the new blockchain transaction being submitted. The second participant device 110 may receive a transaction identifier as a notification from the blockchain node that the new blockchain transaction was successfully confirmed, added to a new block, and posted to the second blockchain. In step 330, the second participant device 110 may electronically transmit the transaction identifier in a notification to the processing server 102 that the blockchain transaction has been successfully posted.

In step 332, the receiving device 202 of the processing server 102 may receive the transaction identifiers from both the first participant device 108 and the second participant device 110 for both blockchain transactions. In step 334, the processing server 102 may identify both blockchain transactions, such as in the blockchain data 210 stored in the processing server 102 or by requesting the blockchain data values from the appropriate blockchain networks 106 using the received transaction identifiers. In step 336, the validation module 218 of the processing server 102 may validate both blockchain transactions. Each blockchain transaction may be validated by the validation module 218 by ensuring that the destination address and currency amount are correct, and by verifying that the hashlock is appropriate, in place, and has not yet expired. Once the transactions have been successfully validated, then, in step 338, the transmitting device 220 of the processing server 102 may electronically transmit the proof value to a blockchain node in both the first blockchain network 106a and second blockchain network 106b to request removal of the hashlocks on both blockchain transactions. With the removal of the hashlocks, the first participant device 108 and second participant device 110 may receive their currency on the appropriate blockchains and the atomic swap completed.

Exemplary Method for Mediation of an Atomic Swap

Figure 4:
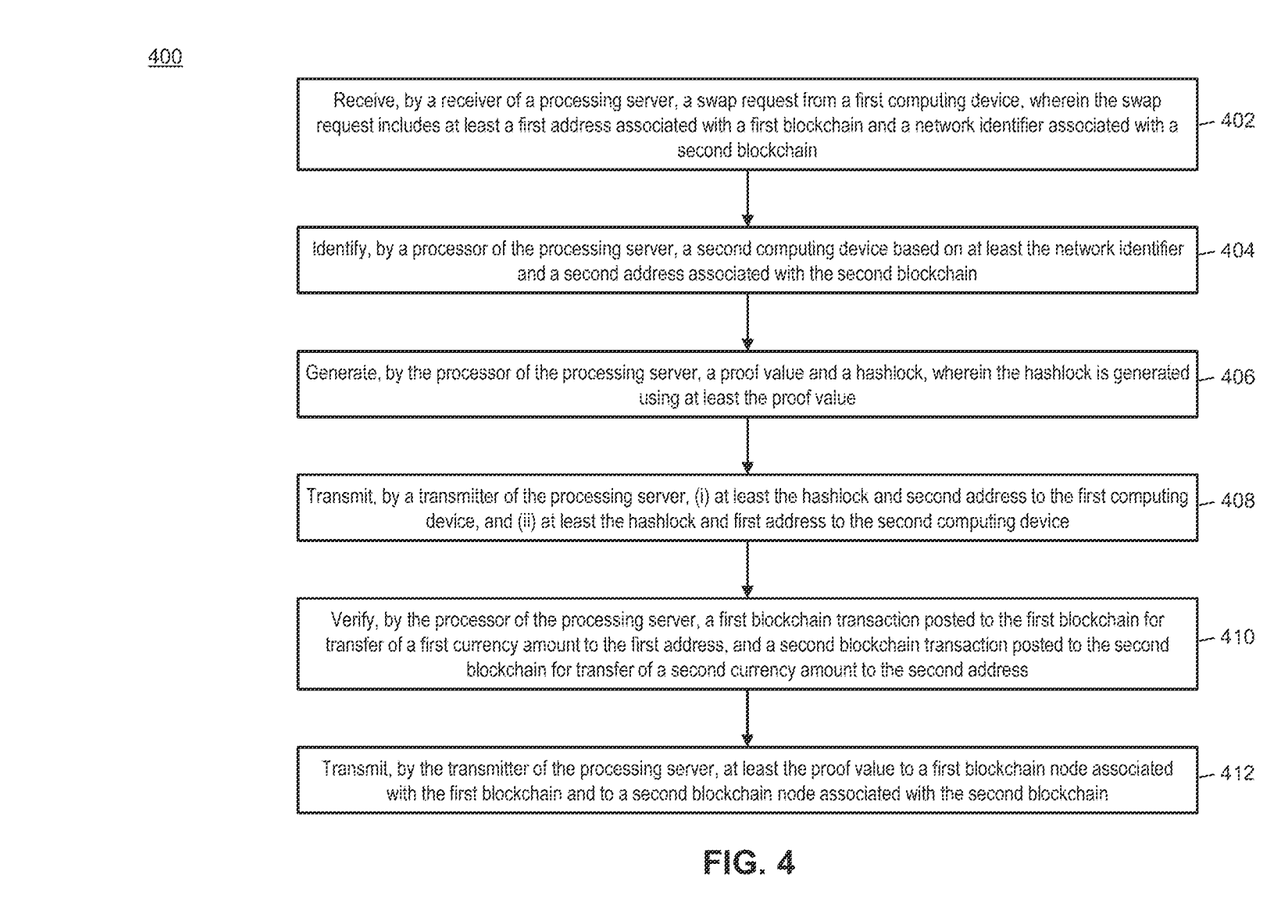
FIG. 4 is a flow chart illustrating an exemplary method for mediating an atomic swap in accordance with exemplary embodiments.

FIG. 4 illustrates a method 400 for the mediation of an atomic swap by a third party processing server.

In step 402, a swap request may be received by a receiver (e.g., receiving device 202) of a processing server (e.g., processing server 102) from a first computing device (e.g., first participant device 108), wherein the swap request includes at least a first address associated with a first blockchain and a network identifier associated with a second blockchain. In step 404, a processor (e.g., querying module 214) of the processing server may identify a second computing device (e.g., second participant device 110) based on at least the network identifier and a second address associated with the second blockchain. In step 406, a proof value and a hashlock may be generated by the processor (e.g., generation module 216) of the processing server, wherein the hashlock is generated using at least the proof value.

In step 408, a transmitter (e.g., transmitting device 220) of the processing server may transmit (i) at least the hashlock and second address to the first computing device, and (ii) at least the hashlock and first address to the second computing device. In step 410, the processor (e.g., validation module 218) of the processing server may verify a first blockchain transaction posted to the first blockchain for transfer of a first currency amount to the first address, and a second blockchain transaction posted to the second blockchain for transfer of a second currency amount to the second address. In step 412, the transmitter of the processing server may transmit at least the proof value to a first blockchain node associated with the first blockchain and to a second blockchain node associated with the second blockchain.

In one embodiment, the second computing device may be identified in the swap request. In some embodiments, identifying the second computing device may include: identifying, by the processor of the processing server, an identifier for each a plurality of additional computing devices based on the network identifier; transmitting, by the transmitter of the processing server, the identifier for each of the plurality of additional computing devices to the first computing device; and receiving, by the receiver of the processing server, an identifier associated with the second computing device from the first computing device. In one embodiment, the swap request may include the first currency amount and the second currency amount. In some embodiments, the first currency amount and the second currency amount may be the same amount.

In one embodiment, the method 400 may further include: receiving, by the receiver of the processing server, first notification data associated with the first blockchain transaction from the second computing device; and receiving, by the receiver of the processing server, second notification data associated with the second blockchain transaction from the first computing device. In a further embodiment, the first notification data and the second notification data may be received prior to verifying the first blockchain transaction and the second blockchain transaction, the first blockchain transaction may be verified using the first notification data, and the second blockchain transaction may be verified using the second notification data. In some embodiments, the method 400 may also include calculating, by the processor of the processing server, the second currency amount based on at least the first currency amount and an exchange rate associated with the second computing device.

Computer System Architecture

FIG. 5 illustrates a computer system 500 in which embodiments of the present disclosure, or portions thereof, may be implemented as computer-readable code. For example, the processing server 102 of FIGS. 1 and 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3A, 3B, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A, 3B, and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for mediating an atomic swap. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for mediating an atomic swap, comprising:
receiving, by a receiver of a processing server, a swap request from a first computing device;
identifying, by a processor of the processing server, a second computing device;
generating, by the processor of the processing server, a proof value and a hashlock, wherein the hashlock is generated using at least the proof value;
transmitting, by a transmitter of the processing server, (i) at least the hashlock and a second address associated with a second blockchain to the first computing device, and (ii) at least the hashlock and a first address associated with the first computing device to the second computing device;
verifying, by the processor of the processing server, a first blockchain transaction posted to a first blockchain for transfer of a first currency amount to the first address, and a second blockchain transaction posted to the second blockchain for transfer of a second currency amount to the second address; and
transmitting, by the transmitter of the processing server, at least the proof value to at least one.

2. The method of claim 1, wherein the second computing device is identified in the swap request.

3. The method of claim 1, wherein identifying the second computing device includes:
identifying, by the processor of the processing server, an identifier for each a plurality of additional computing devices based on the network identifier;
transmitting, by the transmitter of the processing server, the identifier for each of the plurality of additional computing devices to the first computing device; and
receiving, by the receiver of the processing server, an identifier associated with the second computing device from the first computing device.

4. The method of claim 1, wherein the swap request includes the first currency amount and the second currency amount.

5. The method of claim 1, wherein the first currency amount and the second currency amount are the same amount.

6. The method of claim 1, further comprising:
receiving, by the receiver of the processing server, first notification data associated with the first blockchain transaction from the second computing device; and
receiving, by the receiver of the processing server, second notification data associated with the second blockchain transaction from the first computing device.

7. The method of claim 6, wherein
the first notification data and the second notification data are received prior to verifying the first blockchain transaction and the second blockchain transaction,
the first blockchain transaction is verified using the first notification data, and
the second blockchain transaction is verified using the second notification data.

8. The method of claim 1, further comprising:
calculating, by the processor of the processing server, the second currency amount based on at least the first currency amount and an exchange rate associated with the second computing device.

9. A system for mediating an atomic swap, comprising:
a first computing device;
a second computing device; and
a processing server including
a receiver receiving a swap request from the first computing device,
a processor
identifying the second computing device, and
generating a proof value and a hashlock, wherein the hashlock is generated using at least the proof value,
a transmitter transmitting (i) at least the hashlock and a second address associated with a second blockchain to the first computing device, and (ii) at least the hashlock and a first address associated with the first computing device to the second computing device, wherein
the processor of the processing server further verifies a first blockchain transaction posted to a first blockchain for transfer of a first currency amount to the first address, and a second blockchain transaction posted to the second blockchain for transfer of a second currency amount to the second address, and
the transmitter of the processing server further transmits at least the proof value to at least one blockchain node.

10. The system of claim 9, wherein the second computing device is identified in the swap request.

11. The system of claim 9, wherein identifying the second computing device includes:
identifying, by the processor of the processing server, an identifier for each a plurality of additional computing devices based on the network identifier;
transmitting, by the transmitter of the processing server, the identifier for each of the plurality of additional computing devices to the first computing device; and
receiving, by the receiver of the processing server, an identifier associated with the second computing device from the first computing device.

12. The system of claim 9, wherein the swap request includes the first currency amount and the second currency amount.

13. The system of claim 9, wherein the first currency amount and the second currency amount are the same amount.

14. The system of claim 9, wherein the receiver of the processing server further receives
first notification data associated with the first blockchain transaction from the second computing device, and
second notification data associated with the second blockchain transaction from the first computing device.

15. The system of claim 14, wherein
the first notification data and the second notification data are received prior to verifying the first blockchain transaction and the second blockchain transaction,
the first blockchain transaction is verified using the first notification data, and
the second blockchain transaction is verified using the second notification data.

16. The system of claim 9, wherein the processor of the processing server further calculates the second currency amount based on at least the first currency amount and an exchange rate associated with the second computing device.

* * * * *